US007847671B1

(12) United States Patent
Riachentsev et al.

(10) Patent No.: US 7,847,671 B1
(45) Date of Patent: Dec. 7, 2010

(54) SUBSEA DATA AND POWER TRANSMISSION INDUCTIVE COUPLER AND SUBSEA CONE PENETRATING TOOL

(75) Inventors: Valeri Riachentsev, Houston, TX (US); Joe Schouster, Katy, TX (US); Rory Satterfield, Houston, TX (US); Gregory Ham, Houston, TX (US)

(73) Assignee: Perry Slingsby Systems, Inc., Houston, TX (US)

( * ) Notice: Subject to any disclaimer, the term of this patent is extended or adjusted under 35 U.S.C. 154(b) by 0 days.

(21) Appl. No.: 12/511,360

(22) Filed: Jul. 29, 2009

(51) Int. Cl.
*H01F 17/06* (2006.01)
*H01F 27/24* (2006.01)
*H01F 27/28* (2006.01)
*G01V 3/00* (2006.01)

(52) U.S. Cl. ....................... 336/220; 336/212; 336/221; 336/178; 340/853.1; 340/854.3

(58) Field of Classification Search .............. 340/854.3, 340/853.1; 336/178, 220, 221, 212
See application file for complete search history.

(56) References Cited

U.S. PATENT DOCUMENTS 4,030,058 A 6/1977 Riffe et al.
4,646,083 A 2/1987 Woods
4,839,644 A 6/1989 Safinya et al.
4,901,069 A * 2/1990 Veneruso ................. 340/854.8
4,928,088 A * 5/1990 Jorion et al. ............. 340/854.7
5,264,776 A 11/1993 Hulsey
5,455,573 A 10/1995 Delatorre
5,818,188 A * 10/1998 Hirai et al. .................. 318/480
6,515,592 B1 2/2003 Babour et al.
6,540,032 B1 4/2003 Krueger
6,670,880 B1 12/2003 Hall et al.
7,187,569 B2 3/2007 Sinha et al.
7,268,697 B2 9/2007 Hall et al.
7,663,462 B2 * 2/2010 Makuth et al. .............. 336/130
7,714,690 B2 * 5/2010 Shoji et al. .................. 336/212
2004/0104799 A1 * 6/2004 Haisch ....................... 336/178

* cited by examiner

*Primary Examiner*—Anh T Mai
(74) *Attorney, Agent, or Firm*—Laurence A. Greenberg; Werner H. Stemer; Ralph E. Locher

(57) ABSTRACT

A subsea data and power transmission apparatus includes primary and secondary open magnetic circuits with coils for wireless data and power transfer between a drilling tool and a drilling rig. The primary magnetic circuit is U-shaped and the secondary is O-shaped. Both magnetic systems are electrically insulated. The electrical signal and power are transferred from one magnetic circuit to another through an air or water gap between the magnetic circuits. The U-shaped and O-shaped magnetic circuits allow communication and power transfer remotely with no mechanical or electrical connectors.

14 Claims, 7 Drawing Sheets

SUBSEA DATA AND POWER TRANSMISSION INDUCTIVE COUPLER AND SUBSEA CONE PENETRATING TOOL

BACKGROUND OF THE INVENTION

Field of the Invention

The invention relates to an apparatus and method for data and power transfer through a water or air gap in a subsea or a downhole environment. More specifically, the environment where the apparatus is being used has no human access to equipment and the equipment requires the establishment of frequent electrical contacts. In particular, the data stored in a tool requires periodic downloads and transfers to the surface. Another subsea application of the U-shaped and O-shaped couplers is to transfer power to the tool for periodic charging of a battery located inside the tool. The invention also relates to a subsea cone penetrating tool.

Environments with high pressure, high temperature, vibration, and aggressive media are not conducive for open connectors on subsea and downhole remotely operated tools. External electrical cables requiring frequent connection for data communication and power transfer are also not applicable in the downhole environment.

Many methods and devices have been developed for data and power transfer between drilling tool and external equipment. However, they still have some disadvantages which do not allow using them in a subsea downhole environment with remotely operated equipment such as Remotely Operated Vehicles (ROV). A data transmission apparatus having first and second electrical conductors is disclosed in U.S. Pat. No. 7,268,697 B2. The first and second electrical conductors are disposed within recesses of first and second complementary surfaces that conduct magnetically and are electrically insulating. The first and second surfaces are in close proximity to each other. The first surface is translatable along the length of the second surface. The first and second electrical conductors are in electromagnetic communication and provide for the transmission of data or power from the first electrical conductor to the second electrical conductor as the first surface overlaps the second surface. The data transmission apparatus may be located in one or more downhole tools.

A system for transmitting data through a string of downhole components is disclosed in U.S. Pat. No. 6,670,880 B1. In one aspect, the system includes first and second magnetically conductive, electrically insulating elements at both ends of the component. Each element includes a first U-shaped trough with a bottom, first and second sides and an opening between the two sides. Electrically conducting coils are located in each trough. An electrical conductor connects the coils in each component. In operation, a varying current applied to a first coil in one component generates a varying magnetic field in the first magnetically conductive, electrically insulating element. The varying magnetic field is conducted to and thereby produces a varying magnetic field in the second magnetically conductive, electrically insulating element of a connected component. The magnetic field thereby generates a varying electrical current in the second coil in the connected component.

An apparatus and method are presented in U.S. Pat. No. 6,515,592 B1 for establishing electrical connection to permanent downhole oilfield installations using an electrically insulated conducting casing. Current is caused to flow in the casing by a source on the surface connected to the casing. One or more permanent downhole installations are electrically connected to the casing and the electrical connection to the casing is used to power the downhole installations. The downhole installations also inject a signal into the insulated casing that passes via the casing to a surface readout which detects and records the downhole signals.

Known technical configurations for establishing electrical connection for data and power transfer in a downhole subsea environment between a drilling tool and surface equipment have issues such as high pressure and temperature, vibration and aggressive media, which do not allow subsea use.

SUMMARY OF THE INVENTION

It is accordingly an object of the invention to provide a non-contact, environmentally insulated, wireless power and data transmission inductive coupler for subsea drilling tools and a subsea cone penetrating tool, which overcome the hereinafore-mentioned disadvantages of the heretofore-known devices of this general type, which are durable, have no moving parts or electrical contacts and allow for subsea operation with ROVs or with other types of subsea robots.

With the foregoing and other objects in view there is provided, in accordance with the invention, a data and power transmission inductive coupler, comprising a U-shaped external transformer to be mounted on a stationary rig or subsea construction. The U-shaped external transformer has a coil and an inner circumferential surface. An O-shaped internal transformer can be mounted on a downhole tool having a maximum tool diameter. The O-shaped internal transformer has a coil and an outer circumferential surface for mating with the inner circumferential surface of the U-shaped external transformer. The outer circumferential surface of the O-shaped transformer is equal to or smaller than the inner circumferential surface of the U-shaped external transformer mating therewith. The O-shaped transformer and the U-shaped transformer have no wire connection therebetween. The O-shaped transformer can be wired to tool electronics and batteries. The U-shaped transformer can be wired to surface equipment or other subsea remotely operated units. The O-shaped transformer has an outer diameter being the same or smaller than the maximum tool diameter and the O-shaped transformer is divided into two equal halves along the diameter for assembling the O-shaped transformer on the tool.

The principle of operation of the invention is based on the ability of the transformer to transfer electrical voltage through an air-filled or water-filled gap. The smaller the gap, the higher the efficiency of the coupler. The inductive coupler includes two transformers. The transformer mounted on the drilling tool must be O-shaped, and the transformer located on the rig must be U-shaped. The inductive coupler was tested through the gap between the U-shaped and O-shaped transformers up to a maximum of 20 mm for data transfer and up to 10 mm for a tool battery charger.

In accordance with another feature of the invention, each of the transformers contains a magnetic circuit formed of a solid steel, laminated steel or ferrite material. Each of the transformers may also contain one, two or more magnetic circuit components between which the coils are respectively disposed.

In accordance with a further feature of the invention, the O-shaped transformer and the U-shaped transformer are mutually spaced apart defining a gap therebetween. The gap may be an air gap or a water gap. The gap may also be adjustable in width.

In accordance with an added feature of the invention, the O-shaped transformer and the U-shaped transformer are freely movable horizontally and vertically relative to each other.

With the objects of the invention in view, there is also provided a subsea cone penetrating tool, comprising at least one inductive coupler according to the invention. Each inductive coupler is configured to operate in a data transfer mode, a power transfer mode and/or a data-encoded-power mode.

In accordance with another feature of the invention, a holder supports the at least one inductive coupler. The holder may have at least one hole formed therein for wires to be connected to the O-shaped transformer, and a junction box for cables to be connected to the U-shaped transformer.

In accordance with a further feature of the invention, the at least one inductive coupler includes upper and lower inductive couplers mutually spaced apart along the holder and aluminum blocks disposed between the inductive couplers on the holder to minimize interference between the transformers. The O-shaped transformers of the inductive couplers are disposed within at least one cutout formed in the holder, and the U-shaped transformers of the inductive couplers are disposed outside the holder.

In accordance with a concomitant feature of the invention, a compartment is provided for batteries and tool electronics.

Other features which are considered as characteristic for the invention are set forth in the appended claims.

Although the invention is illustrated and described herein as embodied in a subsea data and power transmission inductive coupler and a subsea cone penetrating tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
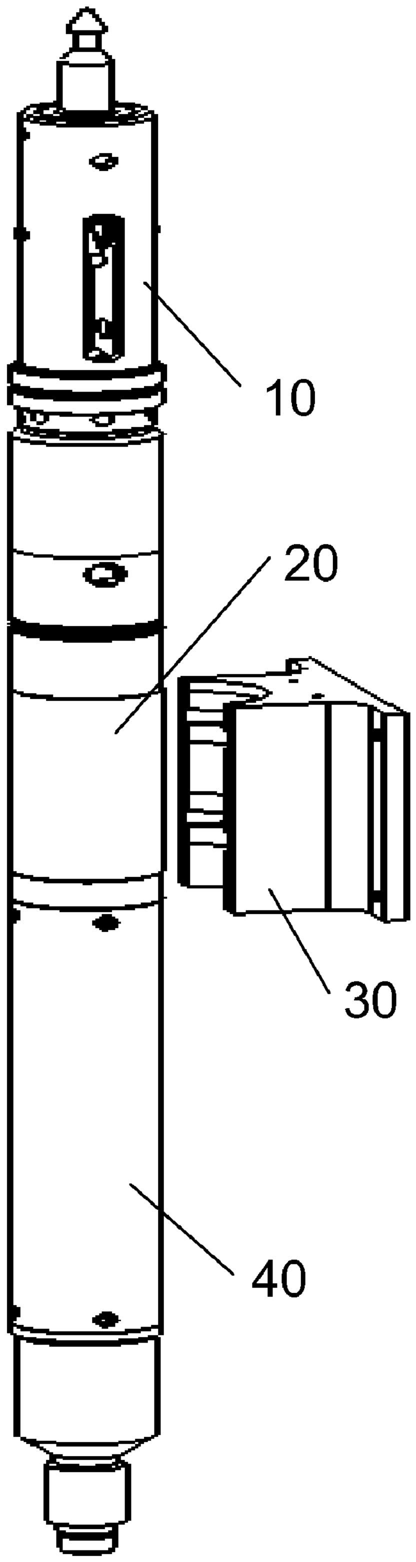
FIG. 1 is a diagrammatic, perspective view of a downhole drilling tool including a data/power transmission system with O- and U-transformers according to a preferred embodiment of the invention.

Referring now to the figures of the drawings in detail and first, particularly, to FIG. 1 thereof, there is seen an example of an assembled subsea CPT (Cone Penetrating Tool) 10 with an inductive coupler. The invention, however, is not limited to use with a CPT, but rather it can be used with other downhole tools and general subsea electrical connectors. Reference numeral 20 indicates an O-shaped transformer, the internal portion of the coupler mounted on the drilling tool. Reference numeral 30 indicates a U-shaped transformer, the external portion of the coupler mounted on the drilling rig or on a stationary construction. Reference numeral 40 indicates a compartment for batteries and tool electronics. The external U-shaped transformer is mounted on a rig in such a way as to provide a minimum air or water gap between the primary U-shaped and secondary O-shaped transformers when the tool is engaged. The U-shaped transformer has a wired connection to an ROV with power and data cables. Power is provided by AC voltage with a frequency range from 50 Hz to 100 kHz. The data line can implement various kinds of communication protocols, specifically, RS485 half or full duplex data transmition.

Figure 4:
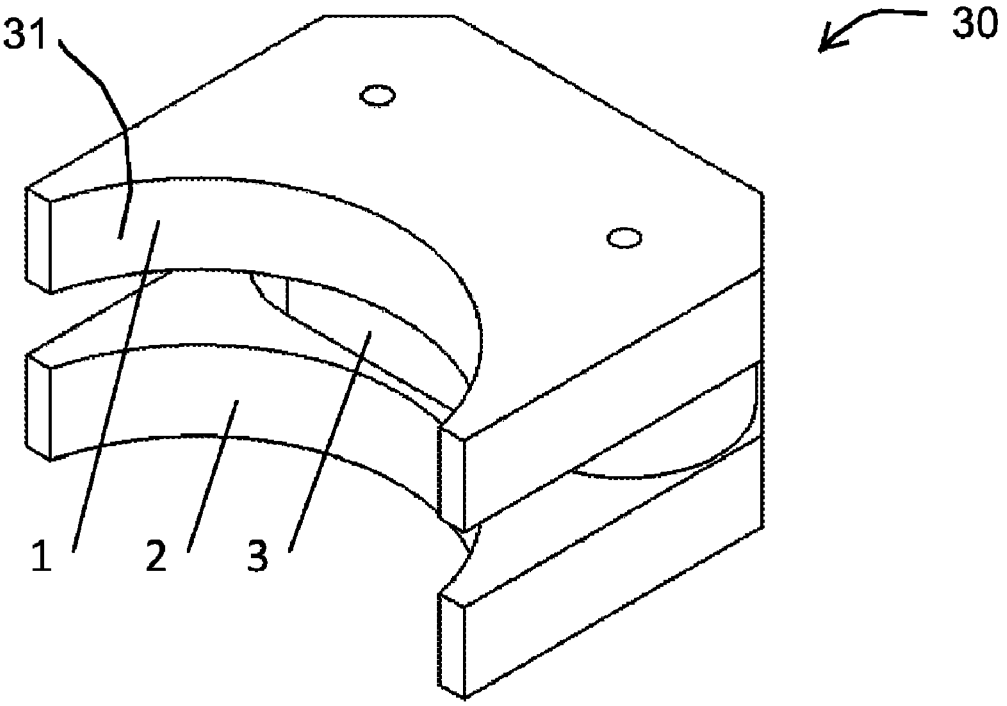
FIG. 4 is a perspective view of a U-transformer.
Figure 5:
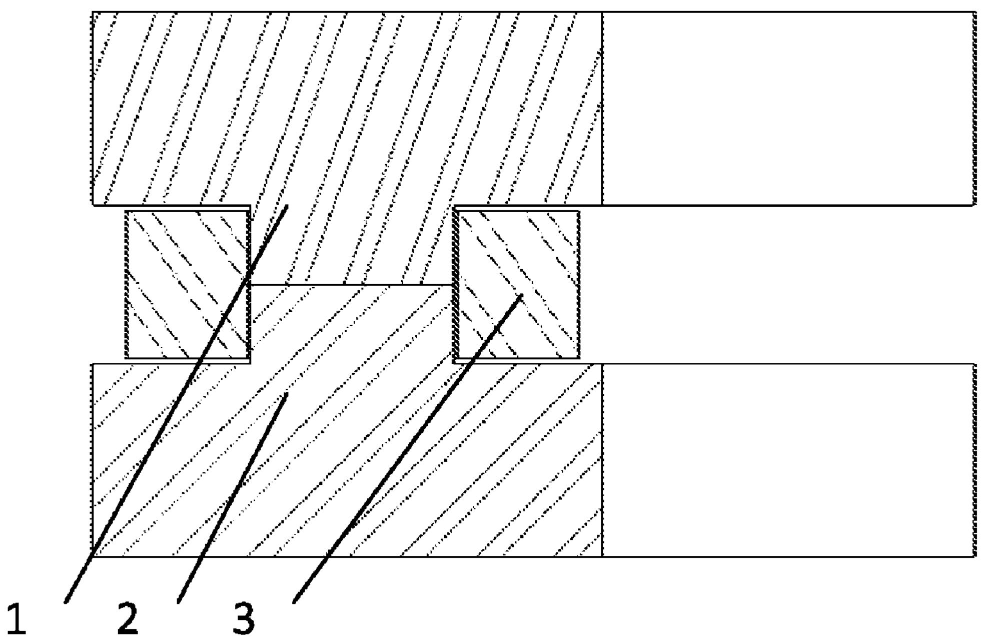
FIG. 5 is a cross-sectional view of a U-transformer.
Figure 6:
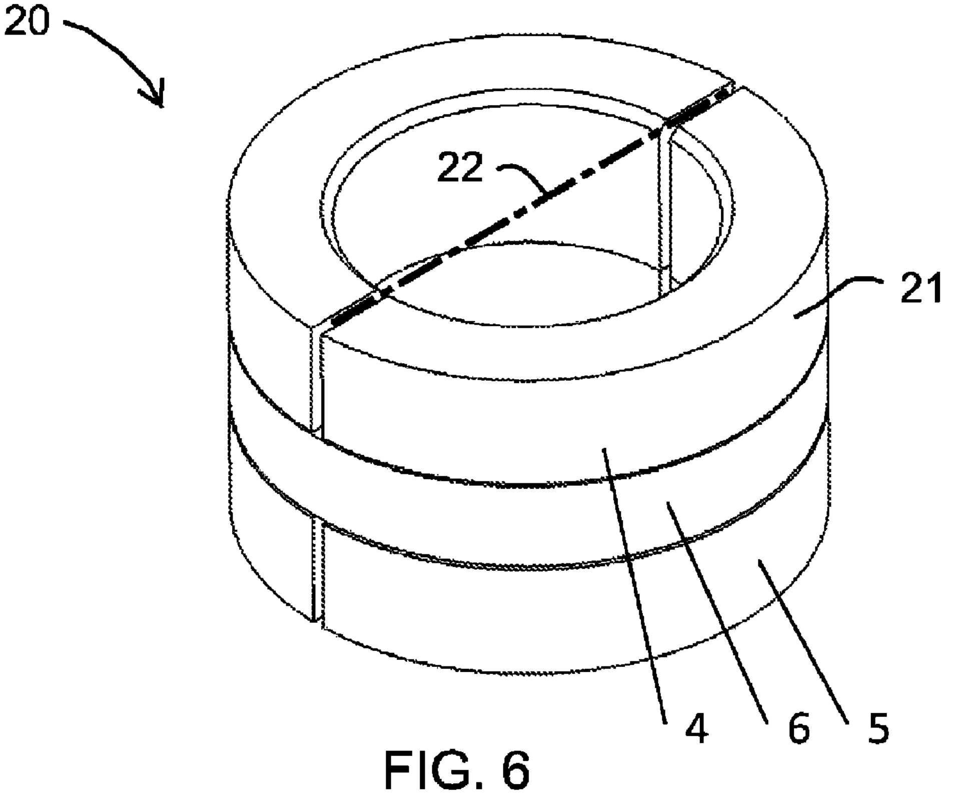
FIG. 6 is a perspective view of an O-transformer.
Figure 7:
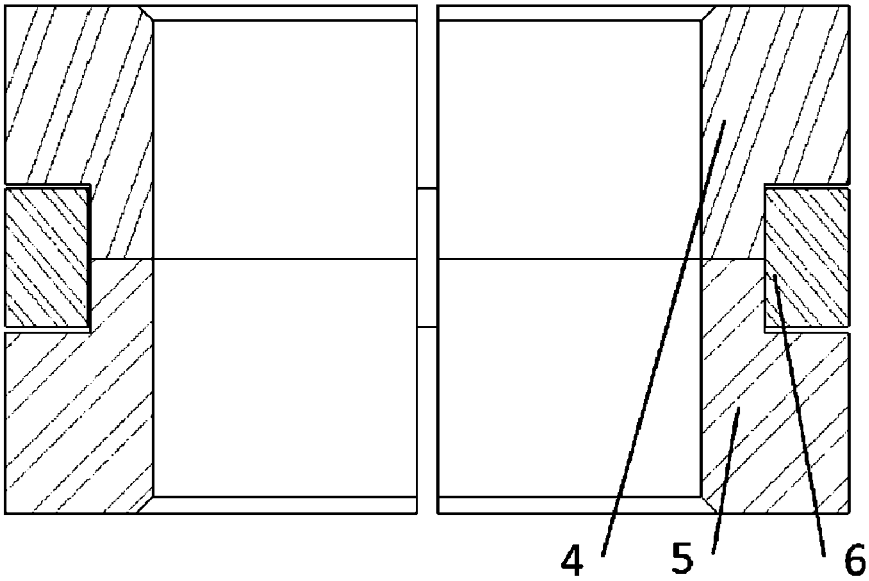
FIG. 7 is a cross-sectional view of an O-transformer.

Each coupler (FIGS. 2-7) includes a U-shaped transformer and an O-shaped transformer. Both transformers are formed of an open magnetic circuit. The U-shaped transformer in FIGS. 4 and 5 includes two magnetic circuit components (reference numerals 1 and 2) defining an inner circumferential surface 31 and a copper wire coil (reference numeral 3). For this specific example, the U-shaped transformer is made of two parts for convenience during assembly, but can be manufactured as a single part. The O-shaped transformer in FIGS. 6 and 7 includes four magnetic circuit components (two each of reference numerals 4 and 5) and a copper wire coil (reference numeral 6) defining an outer circumferential surface 21 and an outer diameter 22. For this specific example, the O-shaped transformer made of four parts for assembly convenience, but it can be manufactured as a single part as well. The magnetic circuit of each transformer is made of magneto-conductive material such as laminated steel, solid steel, ferrite, etc.

Figure 2:
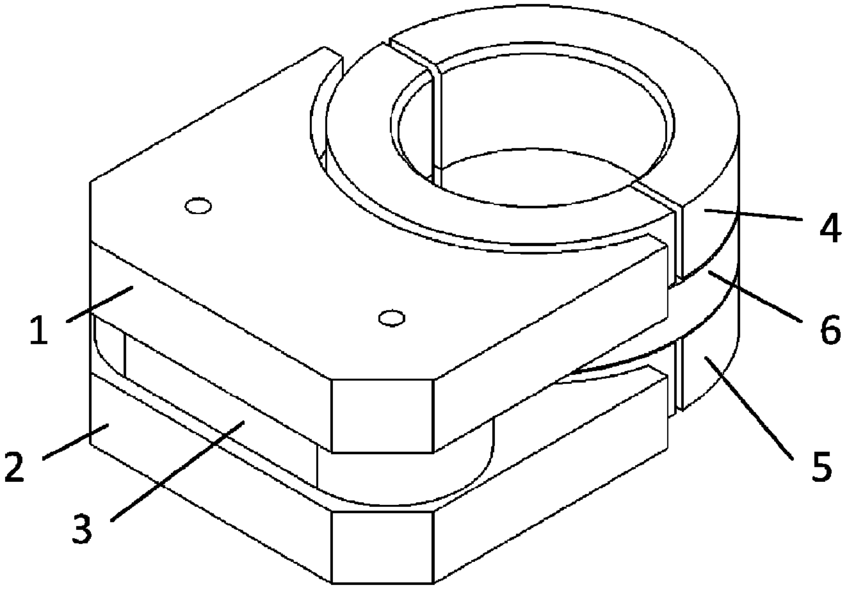
FIG. 2 is a perspective view of an inductive coupler in assembly including O- and U-transformers.
Figure 3:
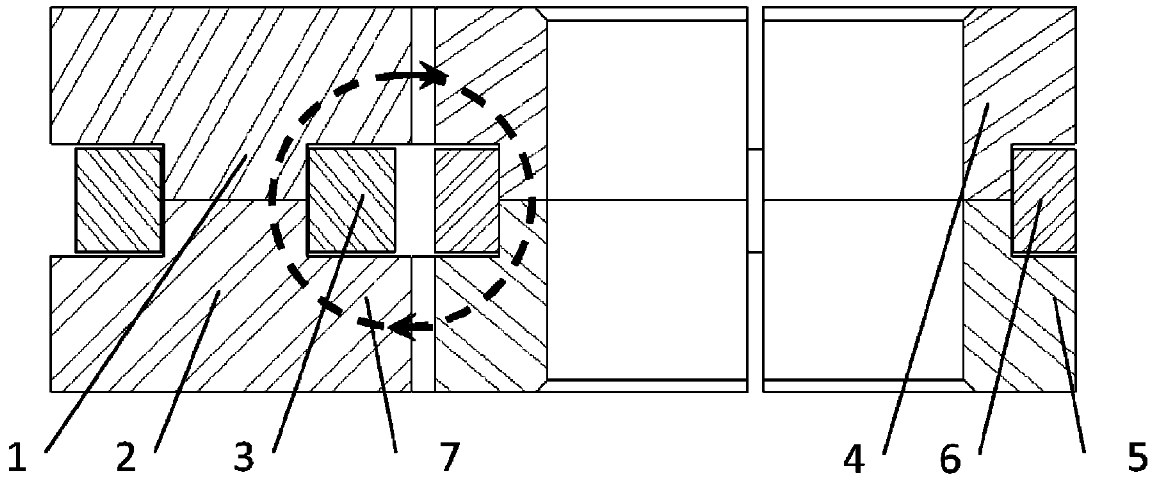
FIG. 3 is a cross-sectional view of an inductive coupler including O- and U-transformers.
Figure 8:
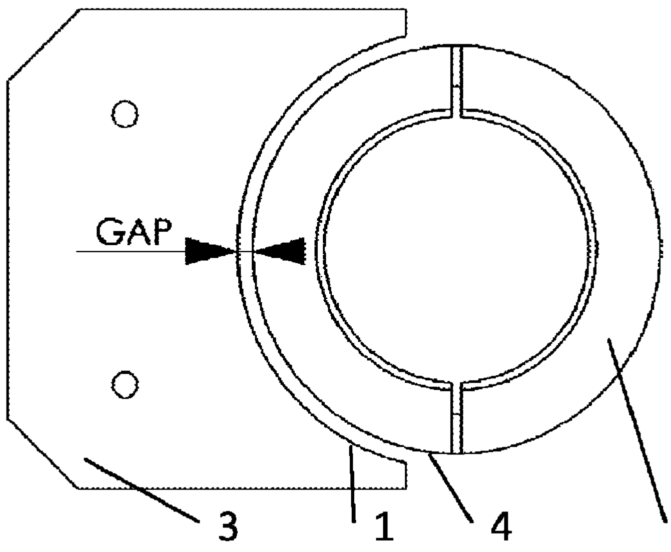
FIG. 8 is a top-plan view of a coupler showing a gap and mating surfaces between O- and U-transformers.

FIGS. 2, 3 and 8 show a general configuration of a single coil inductive coupler structure including a U-shaped and an O-shaped transformer. Voltage from one transformer can be transferred into another transformer when a gap between the two transformers is small enough for a magnetic field generated by one transformer to induce voltage into the coil of another transformer. Both transformers can act as the transferor or the receiver of data or power. The gap between mating surfaces of the magnetic circuit components 1 and 4 in FIG. 8 has to be constant along the surfaces or the O-shaped transformer may have a smaller radius, for operation in a heavy mud environment.

Figure 9:
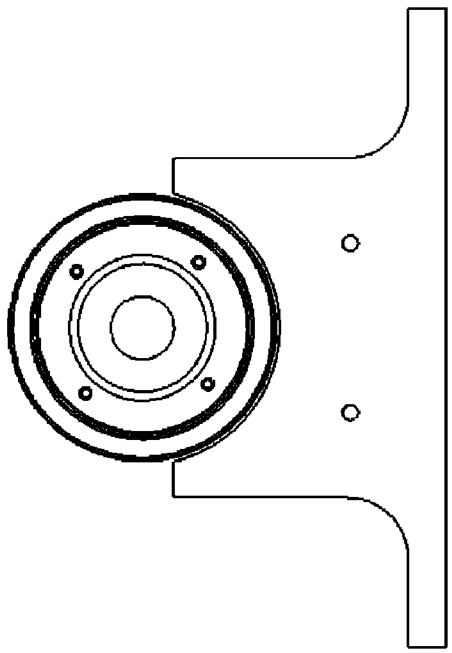
FIG. 9 is a top-plan view of a coupler showing a minimum gap between O- and U-transformers.
Figure 10:
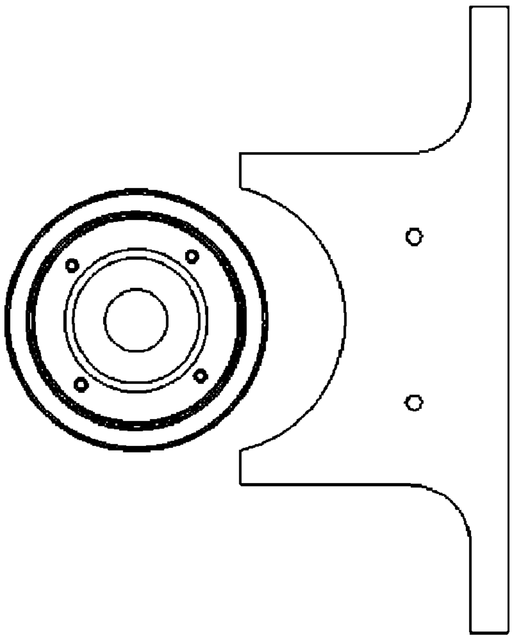
FIG. 10 is a top-plan view of a coupler showing an increased gap between O- and U-transformers.
Figure 11:
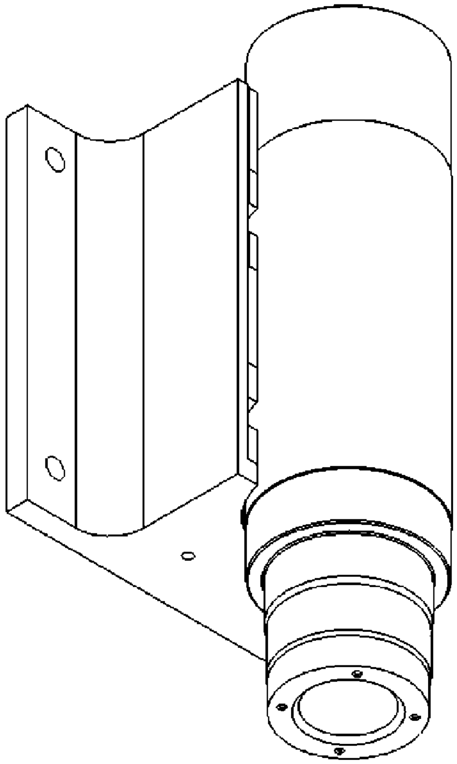
FIG. 11 is a perspective view of an inductive coupler in engaged position for data and power transfer.
Figure 12:
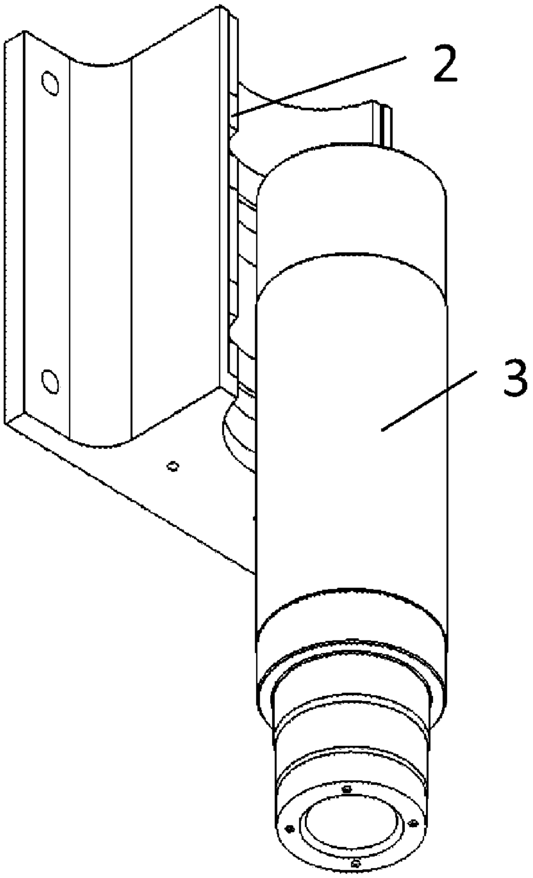
FIG. 12 is a perspective view of an inductive coupler in disengaged position.

The O-shaped transformer is mounted on a downhole tool and is free to move in horizontal direction, as seen by comparing FIGS. 11 and 12, or in vertical direction, as seen by comparing FIGS. 9 and 10.

Each tool may have one or several inductive couplers. Each of the induction couplers can operate in one mode at a time: data, power, or data-encoded-power. Data in a single inductive coupler can be transferred in one direction only. The data-encoded-power mode is a mode when power is transferred with modulated/encoded voltage. This mode allows the data and power to be transferred simultaneously in one direction.

A multi-coupler system can be used, depending on the required task, in various combinations of couplers for power, data and data directions. For instance, two couplers can provide simultaneous power and data transfer, where data can be transferred in both directions such as with half duplex RS485. A 3-coupler system can have simultaneous power and full-duplex RS485 data connection.

Figure 13:
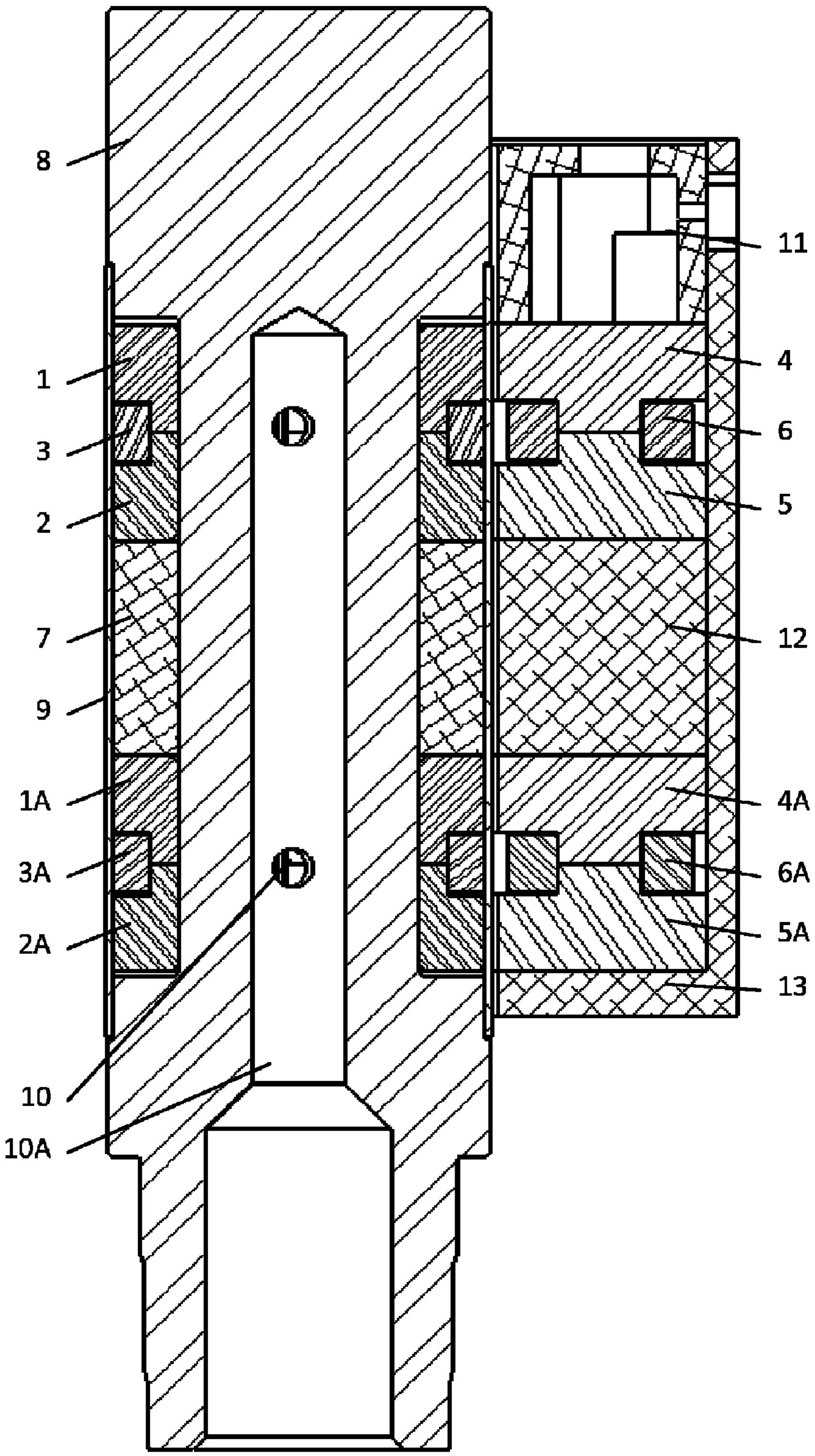
FIG. 13 is a longitudinal-sectional view of an inductive coupler including O- and U-transformers.

FIG. 13 shows a specific structure of a 2-coupler system for a CPT (Cone Penetration Tool) for ROV operations subsea. One coupler (upper), identified by reference numerals 1-6, is used for power transfer only. This coupler is designated for battery charging inside the CPT tool. The power transformer provides energy for CPT battery charging ranging from 20 to 30V and 1 to 1.5 A for a gap range of 0 to 10 mm. A lower coupler, identified by reference numerals 1A-6A, is designated for half duplex RS485 data transfer. The data rate in the half duplex line was 38 Kbit/sec for the gaps (from 0 to 20 mm) between transformers. The coils and magneto-conductive elements of the transformers are mounted on a holder (reference numeral 8 in FIG. 13) for the CPT tool and inside an enclosure (reference numeral 13) for the external transformer. Reference numerals 7 and 12 are blocks made of aluminum and are installed to minimize interference between the power and data transformers. CPT tool wires from the O-shaped transformer pass through holes 10 and 10A and connect to electronic modules of the tool. Wires from the external U-shaped transformer inside a junction box (reference numeral 11) connect to cables which lead to the surface or other subsea devices such as an ROV. The O-shaped transformer is covered with non-magnetic material (reference numeral 9) to seal the coils from the environment.

The invention claimed is:

1. A data and power transmission inductive coupler, comprising:

a) a U-shaped external transformer to be mounted on a stationary rig or subsea construction, said U-shaped external transformer having a coil and an inner circumferential surface;

b) an O-shaped internal transformer to be mounted on a downhole tool having a maximum tool diameter, said O-shaped internal transformer having a coil and an outer circumferential surface for mating with said inner circumferential surface of said U-shaped external transformer;

c) said outer circumferential surface of said O-shaped transformer being equal to or smaller than said inner circumferential surface of said U-shaped external transformer mating therewith;

d) said O-shaped transformer and said U-shaped transformer have no wire connection therebetween;

e) said O-shaped transformer being configured to be wired to tool electronics and batteries;

f) said U-shaped transformer being configured to be wired to surface equipment or other subsea remotely operated units; and g) said O-shaped transformer having an outer diameter not exceeding the maximum tool diameter, and said O-shaped transformer being divided into two equal halves along said diameter for assembling said O-shaped transformer on the tool.

2. The inductive coupler according to claim 1, wherein each of said transformers contains a magnetic circuit formed of a material selected from the group consisting of solid steel, laminated steel and ferrite.

3. The inductive coupler according to claim 1, wherein each of said transformers contains at least two magnetic circuit components between which said coils are respectively disposed.

4. The inductive coupler according to claim 1, wherein said O-shaped transformer and said U-shaped transformer are mutually spaced apart defining a gap therebetween.

5. The inductive coupler according to claim 4, wherein said gap is an air gap.

6. The inductive coupler according to claim 4, wherein said gap is a water gap.

7. The inductive coupler according to claim 4, wherein said gap is adjustable in width.

8. The inductive coupler according to claim 1, wherein said O-shaped transformer and said U-shaped transformer are freely movable horizontally and vertically relative to each other.

9. A subsea cone penetrating tool, comprising at least one inductive coupler according to claim 1.

10. The subsea cone penetrating tool according to claim 9, wherein each inductive coupler is configured to operate in at least one of a data transfer mode, a power transfer mode or a data-encoded-power mode.

11. The subsea cone penetrating tool according to claim 9, which further comprises a holder supporting said at least one inductive coupler.

12. The subsea cone penetrating tool according to claim 11, wherein said holder has at least one hole formed therein for wires to be connected to said O-shaped transformer, and a junction box for cables to be connected to said U-shaped transformer.

13. The subsea cone penetrating tool according to claim 11, wherein said at least one inductive coupler includes upper and lower inductive couplers mutually spaced apart along said holder, aluminum blocks are disposed between said inductive couplers on said holder, said O-shaped transformers of said inductive couplers are disposed within at least one cutout formed in said holder, and said U-shaped transformers of said inductive couplers are disposed outside said holder.

14. The subsea cone penetrating tool according to claim 11, which further comprises a compartment for batteries and tool electronics.

* * * * *